United States Patent [19]
Stalter, Sr.

[11] 3,927,162
[45] Dec. 16, 1975

[54] METHOD OF MOLDING A POLYURETHANE FOAM INVOLVING USE OF A FAN-LIKE SPRAY NOZZLE

[75] Inventor: Robert J. Stalter, Sr., Bowling Green, Ohio

[73] Assignee: The Goodyear Tire & Rubber Company, Akron, Ohio

[22] Filed: Dec. 20, 1973

[21] Appl. No.: 426,762

[52] U.S. Cl. ............. 264/51; 239/597; 260/2.5 BC; 264/54; 264/309
[51] Int. Cl. ............................................ B29d 27/04
[58] Field of Search ........ 264/54, 309, 51; 239/597; 260/2.5 BC, 2.5 BD

[56] References Cited
UNITED STATES PATENTS

| | | | |
|---|---|---|---|
| 3,081,487 | 3/1963 | Heffner et al. | 264/54 X |
| 3,172,925 | 3/1965 | Preotle | 264/54 X |
| 3,181,199 | 5/1965 | Voelker | 264/47 X |
| 3,216,849 | 11/1965 | Jacobs | 264/54 X |
| 3,383,054 | 5/1968 | Nugarus | 239/597 |
| 3,416,736 | 12/1968 | Marik | 239/597 X |
| 3,421,932 | 1/1969 | McGregor et al. | 264/54 X |
| 3,436,022 | 4/1969 | Ernst | 239/597 X |
| 3,719,963 | 3/1973 | Bullock | 264/46.4 X |

*Primary Examiner*—Philip E. Anderson
*Attorney, Agent, or Firm*—F. W. Brunner; J. D. Wolfe

[57] ABSTRACT

Method of producing polyurethane foam by distributing a liquid polyurethane reaction mixture containing an organic polyisocyanate reactive hydrogen containing polymeric material and a blowing agent under pressure of 0.5 to 200 pounds per square inch above atmospheric pressure and distributing the polyurethane reaction mixture in a fan-like planular pattern across at least part of the mold cavity while moving the mold and pouring head relative to each other.

3 Claims, 3 Drawing Figures

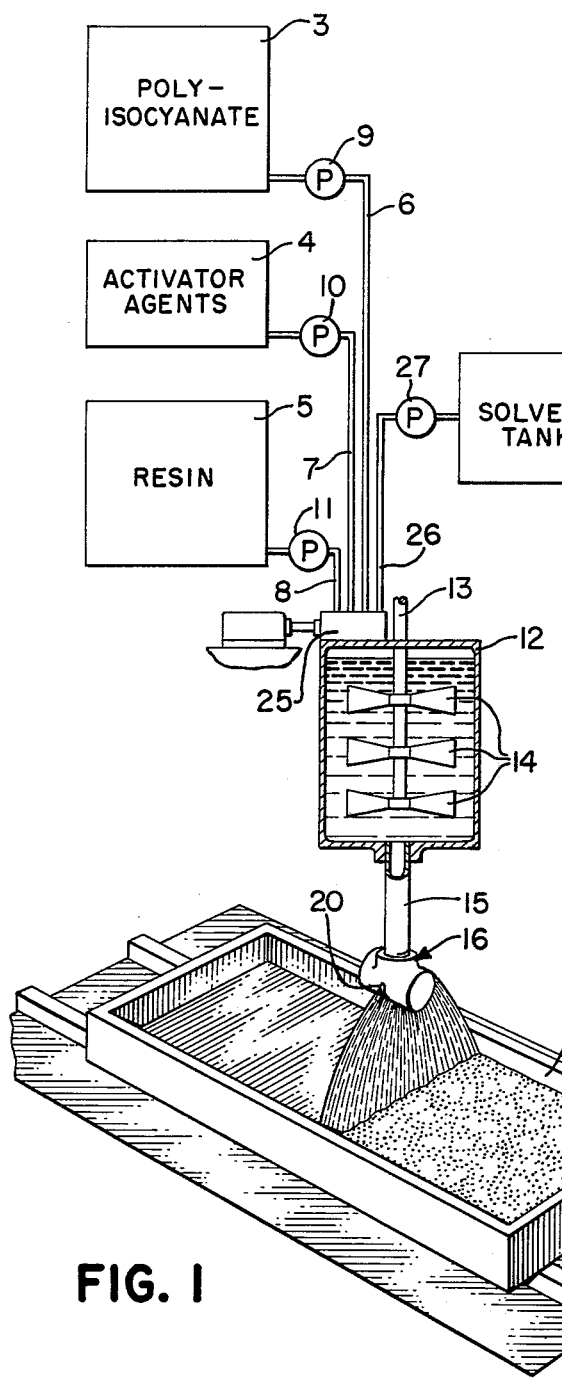
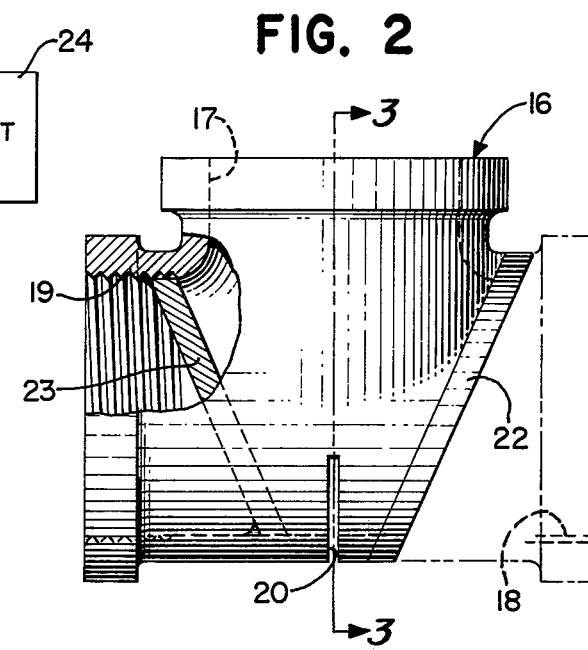
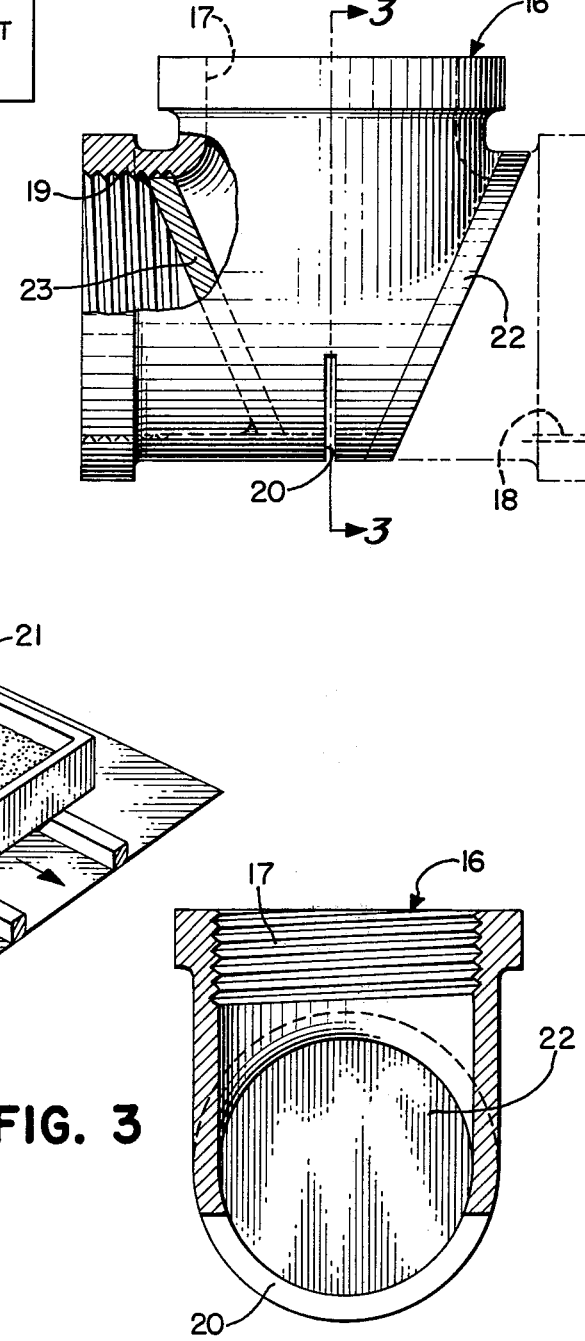

METHOD OF MOLDING A POLYURETHANE FOAM INVOLVING USE OF A FAN-LIKE SPRAY NOZZLE

This invention relates to a method useful in the production of polyurethane foam products.

The principal object of this invention is to provide a method for the uniform distribution of liquid phase polyurethane foam over the pour surface (slab belt, mold, etc.) with single directional movement of either the pour head or of the pour surface.

Additional advantages and objects will be apparent from the drawings wherein

FIG. 1 is a schematic view of a pressurized foaming apparatus and a conveyor for moving a pour surface past the polyurethane foaming apparatus, and FIG. 2 is an enlarged elevational view of the device for distributing the foaming mixture from the mixer onto the pour surface;

FIG. 3 is an enlarged view in cross-section along line 3—3 of FIG. 2.

Referring specifically to FIG. 1, numeral 3 represents an organic polyisocyanate storage tank; numeral 4 is the activator tank and numeral 5 is the resin tank. The storage containers 3, 4 and 5 are connected by suitable piping such as lines 6, 7 and 8 containing pumps 9, 10 and 11 to the polyurethane mixing head 12. The mixing head 12 preferably contains a motor-driven agitator 13 having suitable projections 14 to facilitate the mixing of the polyisocyanate, activator and resins while maintaining them under a pressure within mixing head 12. The reaction mixture passes from the mixing head 12 into the distribution pipe 15 having fan nozzle 16 producing a fan-like pour stream, hence the name "fan nozzle". Items 1 through 14 are typical of a common type polyurethane foaming machine.

From the fan nozzle 16 the liquid phase polyurethane mixture sprays into the mold 21. The height of the fan nozzle above the mold is adjusted to lay down a charge of liquid phase polyurethane mixture in a pour pattern of desired width which may extend full width of the mold. Where the entire surface from one side to the other side of the pouring surface, viz. a mold, receives the charge at essentially the same time, the foaming begins simultaneously throughout the mold or slab cross-section. Thus, there is less tendency for the foam to collapse, while in a tender state, due to the pressure differential developed because of uneven foaming and consequent flow from one area to another. Especially is this true where the mold contains dams or gates which develop specific contours in the foam, for instance, in a molded bucket seat.

As the mold 21 in FIG. 1 moves past the pouring head, the liquid phase polyurethane mixture is first charged into the front end of the mold cavity and as the back end of the mold cavity passes beneath the pouring head, actuation of valve 25 closes the ports communicating between mixer 12 and lines 6, 7 and 8. Mold 21 moves from beneath the device 15, at which time actuation of valve 25 stops the feeding of ingredients for the liquid polyurethane mixture to the mixer and opens the port communicating between mixer 12 and line 26. With the port in valve 25 open to line 26, the methylene chloride, methyl ethyl ketone or related solvent from storage tank 24 was pumped into the mixing chamber 12 to flush out any liquid polyurethane mixture remaining in the mixer and thus leave the mixer 12 and nozzle device 16 in a clean condition. Thus the mixer was ready to pour a second mold upon the proper manipulation of valve 25 which would close the port communicating with line 26 and mixer 12 and open the ports between mixer 12 and lines 6, 7 and 8.

Use of this device in a slab foam operation would be essentially as described except the pour time would be extended and continuous as dictated by the production schedule. It should be understood that slab production schedules can vary from minutes to an hour or more.

The fan nozzle 16 is more readily understood and discussed by reference to FIG. 2. The fan nozzle is shown in this instance as a modified T-fitting which has openings 17, 18 and 19. The opening 17 of the T-fitting screws on the end of pipe 15 in the manner shown best in FIG. 1. The openings 18 and 19 are closed by angle members 22 and 23 respectively being welded or otherwise fixed in the fitting to block these openings. Then the fitting has opening 20 precision cut or sawed therein in the manner shown best in FIGS. 2 and 3. In FIG. 3 the cut 20 is shown as sufficient to give a 140° arc. An experienced foam operator would readily appreciate a 100° arc could yield a satisfactory pattern where the distance between the nozzle and pour surface are properly adjusted to give the desired spray angle or pattern.

Width of the pour stream is determined by a number of parameters, the arc length and width of the slot, the geometric shape of the slot (in this instance circular), but any geometric shape can be used with each having its own unique effect on the pour stream and distribution of material across the pour stream, the pressure in the mixing chamber and the height of the fan nozzle above the pour surface. Generally, the pressure is essentially fixed for a given pouring machine at the standard operating conditions. It is usually desirable that the fan angle be sufficient to provide a pour pattern of such width that minimum flow is required to fill out the mold. Reinforcing members such as burlap or cloth may be placed in the mold adjacent the sides, and the impingement of liquid aids in retention of the fabric in the desired place in the mold where a reinforced molded article is being made.

A further advantage of using this pour distribution device is that it prevents splashing and cavitation due to the impingement of a relative high pressure stream on the pouring surface and gives proper filling of a mold having gates, dams or other dividers therein. Since the motion is in one direction only, such distribution reduces air entrappment on the pour surface or foam foldover from the pour stream. The resultant product has uniform properties along a line perpendicular to the direction of the pour motion since the distribution is achieved without oscillation. The device, appropriately designed, can be attached directly to the outlet of any polyurethane foaming machine with minimum increase in back pressure and is especially suited to the so-called low pressure polyurethane foaming machine but may also be used with the high pressure foaming machines to replace the conventional pressure reducers.

In the operation of the foaming apparatus the polyisocyanate, activator and resin are pumped into the mixing head 12 at a sufficient rate and pressure to develop a pressure in the head in excess of atmospheric pressure, preferably 0.5 to 60 psi and usually less than about 200 psi. Normally the detrimental effect of relatively high pressure flashing or spattering is very evident at pressures of around 5 to 80 pounds per square inch. It is evident that as the pressure change across the nozzle or outlet increases, the volatile components (such as blowing agents) are more likely to flash off.

Futher objects and advantages of this invention will be readily apparent from the following working example:

Toluene diisocyanate was placed in tank 3. A mixture comprising 100 parts of polypropylene ether polyol of about 2000 to 3000 molecular weight, 0.15 part of triethylene diamine, 0.5 part of N-ethyl morpholine, 4 parts water and 2.5 parts of a commercial silicone which is a block copolymer containing ethylene and propylene radicals was placed in tank 5. As auxiliary agent a mixture comprising 0.15 part of stannous octoate and 2 to 12 parts of difluoro dichloro methane in sufficient polypropylene ether polyol to give a readily pumpable mixture, was placed in the auxiliary agent tank 4. Methylene chloride was placed in tank 24. Pumps 9, 10 and 11 were started to pump the ingredients in tanks 3, 4 and 5 into the mixer 12, when the synchronized valve 25 was actuated. The stirrer 13 was started prior to the time the ingredients were charged to the mixer 12. The polyurethane reaction mixture was formed in the mixer 12 at a pressure of about 10 pounds per square inch above atmospheric pressure and was allowed to flow into the pipe 15 to distribution device 16 to charge the mold in a fan-shaped pattern.

To those skilled in the art it should be readily apparent that instead of polypropylene ether polyol, hydroxyl terminated polyester or polyester amides may be utilized in making polyurethane foams. The polyesters are made by esterification of dicarboxylic acids with glycols. For instance, polypropylene glycol of about 750 to 6500 molecular weight, polypropylene adipate of about 750 to 6500 molecular weight having an acid number less than about 5 and a hydroxyl number from about 20 to 150 may be utilized in making polyurethane foam. Broadly, the materials useful in making polyurethane foams are sometimes characterized as reactive hydrogen containing polymeric material as determined by the Zerewitinoff method and which have a molecular weight of about 550 to 6500.

Any of the organic polyisocyanates normally used in making polyurethane foam can be utilized with this invention. Representative of those utilized commercially are toluene diisocyanate, and the commercial diisocyanate and mixtures of the diisocyanate with higher functional isocyanates produced by the phosgenations of the reaction product obtained by reacting aldehydes with aromatic amine, for instance, formaldehyde with aniline.

The liquid polyurethane reaction mixture normally is formed by mixing the ingredients at ambient temperature, say around 75°F. but this does not mean temperatures of 50°F. or 100°F. cannot be used.

The fan nozzle device can be attached to the outlet of a polyurethane foaming machine to produce a fan-like pour stream of a desired width to coincide with the width of the mold or pour surface, with a distribution of material across the stream uniform or nonuniform dependent on the geometric configuration chosen, with a minimum increase in back pressure such that the device can be used with either a low pressure or high pressure type of foam machine and that such stream velocity will be low enough to prevent splasing and the associated problems such as trapped air and breakdown. Furthermore, it is possible to pour a rectangular mold with motion of either the pour head or mold limited to one direction. The device is especially beneficial in pouring molds with uneven surface or having projections which form compartments in precluding air entrappment. Products so produced will have uniform properties across the cross-section both during processing and upon completion.

This invention is particularly useful in molding high resilient foams where the polyurethane reaction mixture has a viscosity range at 25°C. of 800 to 3000 centistokes as well as hot polyurethane foams where the reaction mixture has a viscosity of 300 to 800 centistokes. Also, with high resilient foam to be illustrative, the mold or pour surface speed past the pouring device is preferably 60 feet per minute, but can vary from a low of 20 to 120 feet per minute, with foam laydown rate varying from several pounds to in excess of 180 pounds per minute. For automobile seating a desirable rate is 50 to 90 pounds per minute, depending on the mold size and the depth of the mold cavity.

While certain representative embodiments and details have been shown for the purpose of illustrating the invention, it will be apparent to those skilled in this art that various changes and modifications may be made therein without departing from the spirit or scope of the invention.

What is claimed is:
1. A method of producing polyurethane foam comprising the steps of
   1. forming a liquid foamable polyurethane reaction mixture comprising an organic polyisocyanate, a reactive hydrogen containing polymeric material having a molecular weight of about 550 to 6500 and blowing agent under a pressure of at least 0.5 to 200 pounds per square inch above atmospheric pressure; and
   2. spraying the foamable polyurethane reaction mixture in a fan-like planular pattern of desired width across a mold cavity while moving the mold and pouring head relative to each other to cover the surface of the mold cavity.

2. The method of claim 1 wherein the pressure in step (1) is 5 to 80 pounds per square inch above atmospheric.

3. The method of claim 1 wherein the organic polyisocyanate is toluene diisocyanate and the reactive hydrogen containing polymeric material is essentially a polypropylene ether polyol.

* * * * *